(12) United States Patent
Yamamoto

(10) Patent No.: US 6,924,933 B2
(45) Date of Patent: Aug. 2, 2005

(54) BINOCULARS

(75) Inventor: Mitsuo Yamamoto, Yokohama (JP)

(73) Assignee: Nikon Corporation, Tokyo (JP)

( * ) Notice: Subject to any disclaimer, the term of this patent is extended or adjusted under 35 U.S.C. 154(b) by 262 days.

(21) Appl. No.: 10/205,226

(22) Filed: Jul. 26, 2002

(65) Prior Publication Data

US 2003/0021023 A1 Jan. 30, 2003

(30) Foreign Application Priority Data

Jul. 27, 2001 (JP) ........................................ 2001-226884

(51) Int. Cl.[7] ............................................. G02B 23/00
(52) U.S. Cl. ........................ 359/410; 359/407; 359/425
(58) Field of Search ................................. 359/407–431, 359/694–706, 813–823

(56) References Cited

U.S. PATENT DOCUMENTS

| 4,346,960 | A | | 8/1982 | Lehrmund et al. | 359/414 |
|---|---|---|---|---|---|
| 4,750,823 | A | * | 6/1988 | Riedl | 359/414 |
| 5,064,279 | A | | 11/1991 | Riedl | 359/416 |
| 5,672,862 | A | * | 9/1997 | Ohara et al. | 250/204 |
| 5,677,789 | A | * | 10/1997 | Funatsu | 359/409 |
| 5,886,815 | A | * | 3/1999 | Nishitani | 359/417 |
| 5,903,387 | A | | 5/1999 | Tomikawa et al. | 359/412 |
| 6,031,663 | A | | 2/2000 | Funatsu | 359/407 |
| 6,266,185 | B1 | * | 7/2001 | Miller et al. | 359/407 |
| 6,335,825 | B1 | * | 1/2002 | Funatsu | 359/412 |

FOREIGN PATENT DOCUMENTS

| JP | 3-163512 | 7/1991 |
|---|---|---|
| JP | 6-59808 | 8/1994 |

* cited by examiner

*Primary Examiner*—Thong Q Nguyen

(57) ABSTRACT

A mechanism for focal adjustment and dipotric deviation adjustment in binoculars. The mechanism includes: a first focal adjustment lens system; a second focal adjustment lens system; a focal adjustment shaft that performs a focal adjustment by causing the first focal adjustment lens system and the second focal adjustment lens system to move along optical axes thereof; and a dioptric deviation adjustment shaft that performs a dioptric deviation adjustment by causing the first focal adjustment lens system to move along the optical axis. The focal adjustment shaft and the dioptric deviation adjustment shaft both are housed within a bridge casing set between the first lens barrel and the second lens barrel. The dioptric deviation adjustment shaft is linked with the first focal adjustment lens system. The focal adjustment shaft is linked with the second focal adjustment lens system and the dioptric deviation adjustment shaft.

6 Claims, 12 Drawing Sheets

SECTIONAL VIEW ALONG A-A

SECTIONAL VIEW ALONG A-A

SECTIONAL VIEW ALONG B-B

SECTIONAL VIEW ALONG C-C

SECTIONAL VIEW ALONG D-D

BINOCULARS

INCORPORATION REFERENCE

The disclosure of the following priority application is herein incorporated by reference:

Japanese Patent Application No. 2001-226884 filed Jul. 27, 2001

BACKGROUND OF THE INVENTION

1. Field of the Invention

The present invention relates to binoculars having a focal adjustment mechanism and a dioptric deviation adjustment mechanism.

2. Description of Related Art

A known example of binoculars having a focal adjustment mechanism and a dioptric deviation (diopter difference between right and left eyes) adjustment mechanism is disclosed in Japanese Laid-Open Patent Publication No. H 3-163512. In this pair of binoculars, a focal adjustment wheel, a diopter adjustment wheel and a main shaft are provided at a bridge portion linking the left lens barrel with the right lens barrel. At the main shaft, which includes a shaft on the base side and a shaft on the front end side, the two shafts are connected with each other along the axial direction through a screw interlock. The shaft on the base side is screw-fitted with the focal adjustment wheel by a screw, whereas the shaft on the front end side is screw-fitted at the diopter adjustment wheel by a screw. Thus, the entire main shaft moves along the axial direction as the focal adjustment wheel is rotated, whereas the shaft on the front end side is driven out along the axial direction relative to the shaft on the base side as the diopter adjustment wheel is rotated. In addition, of the objective lenses provided in the left lens barrel and the right lens barrel, one is linked with the shaft on the base side and the other is linked to the shaft on the front end side. As a result, the entire main shaft moves as one along the axial direction when the user rotates the focal adjustment wheel, which allows both the left objective lens and the right objective lens to move along the optical axis to perform a focal adjustment. When the user rotates the diopter adjustment wheel, on the other hand, the shaft on the front end side of the main shaft alone is driven out along the axial direction to perform a diopter adjustment by causing the objective lens linked to the shaft on the front end side to move along the optical axis.

As described above, the binoculars disclosed in Japanese Laid-Open Patent Publication No. H 3-163512 adopt a structure that causes the entire main shaft to move for a focal adjustment and allows only the front end portion of the main shaft to be driven out for a diopter adjustment. As a result, the entire main shaft moves within the bridge during the focal adjustment, whereas the length of the main shaft increases/decreases during the diopter adjustment.

The size of the bridge where the main shaft is provided is determined in advance during the design stage by ensuring that the bridge size affords ease of use. The length of the lens barrels and the length of the bridge are both set at particularly small values when designing compact and thus portable binoculars. If the binocular structure disclosed in Japanese Laid-Open Patent Publication No. H 3-163512 is adopted in such compact binoculars, the length of the entire main shaft increases as the front end portion of the main shaft is driven out for a diopter adjustment, and since this reduces the range over which the main shaft can be moved within the bridge for a focal adjustment, the focal adjustment range, too, becomes smaller. Namely, when L represents the length along which the main shaft can move within the bridge, a relationship expressed as; L=L1+L2 is achieved by the range L1 of movement made for the focal adjustment and the range L2 of the movement made for the diopter adjustment. Thus, when the user wishes to move the objective lenses by a large extent in order to focus the binoculars on an object present within a closer range, the objective lenses cannot be moved to the focusing position if the diopter adjustment quantity is significant. This leads to a problem in that the shortest focus distance (the shortest possible distance to an object that can be in focus) cannot be reduced. There is another problem in that depending upon the specific movement restrictions that are imposed, the shortest focus distance may change in correspondence to the diopter adjustment position.

In addition, the binoculars disclosed in Japanese Laid-Open Patent Publication H3-163512 have a problem in that play readily occurs as the main shaft moves during a focal adjustment operation. As described earlier, the shaft on the base side and the shaft on the front end side constituting the main shaft are linked to each other through a screw interlock. The end of the base side shaft is supported at the focal adjustment wheel through a screw interlock as well. The end of the front end side shaft is supported at the diopter adjustment wheel at which the shaft end is fitted in a spline structure or it is supported by a movable rod (guide rod) passing through a bridge member linking the main shaft to the objective lenses. This means that the base side shaft is supported at both ends through a screw interlock. For this reason, operational play tends to occur readily during a focal adjustment. The front end side shaft, on the other hand, is supported at one end through a screw interlock and at the other end through a spline structure. While the play attributable to the use of the screw is insignificant, the shaft is allowed to deflect to the left and the right by an extent corresponding to the difference between the diameter of the through hole through which the guide rod provided at the bridge member passes and the diameter of the guide rod. Since the diameter of the through hole must be set at a fairly large value to absorb the parts tolerance with regard to the gap between the guide rod and the main shaft, operational play also occurs when the front end side shaft of the main shaft is supported by the guide rod. Such operational play at the main shaft occurring during the execution of a focal adjustment, and in particular, operational play manifesting to the left and the right of the shaft, results in an error with respect to the positions of the left and right objective lenses of the binoculars which, in turn, leads to a dioptric deviation between the left and right sides.

SUMMARY OF THE INVENTION

The present invention provides binoculars having a focal adjustment function and a dioptric deviation adjustment function, which allows the focal adjustment to be performed over a wide range.

The first binoculars according to the present invention comprises: a first lens barrel having a first focal adjustment lens; a second lens barrel having a second focal adjustment lens; a bridge linking the first lens barrel and the second lens barrel; a focal adjustment shaft that is provided in the bridge and operates to move both the first focal adjustment lens and the second focal adjustment lens along optical axes thereof for a focal adjustment; and a dioptric deviation adjustment shaft that is provided in the bridge and operates to move only the first focal adjustment lens along the optical axis for a dioptric deviation adjustment, and: the focal adjustment shaft and the dioptric deviation adjustment shaft are set parallel to each other.

The second binoculars according to the present invention comprises: a first focal adjustment lens system; a second focal adjustment lens system; a focal adjustment shaft that performs a focal adjustment by causing the first focal adjustment lens system and the second focal adjustment lens system to move along optical axes thereof; and a dioptric deviation adjustment shaft that performs a dioptric deviation adjustment by causing the first focal adjustment lens system to move along the optical axis, and: the first focal adjustment lens system and the second focal adjustment lens system are respectively housed in a first lens barrel and a second lens barrel; the focal adjustment shaft and the dioptric deviation adjustment shaft both are housed within a bridge casing set between the first lens barrel and the second lens barrel; the dioptric deviation adjustment shaft is linked with the first focal adjustment lens system; the focal adjustment shaft is linked with the second focal adjustment lens system and the dioptric deviation adjustment shaft; and the focal adjustment shaft does not hinder the dioptric deviation adjustment by the dioptric deviation adjustment shaft, and keeps a relative distance between the focal adjustment shaft and the dioptric deviation adjustment shaft extending along the optical axis.

The third binoculars according to the present invention comprises: a first focal adjustment lens system; a second focal adjustment lens system; a focal adjustment shaft that performs a focal adjustment by causing the first focal adjustment lens system and the second focal adjustment lens system to move along optical axes thereof; and a dioptric deviation adjustment shaft that performs a dioptric deviation adjustment by causing the first focal adjustment lens system to move along the optical axis, and: the focal adjustment shaft is set parallel to the dioptric deviation adjustment shaft; the dioptric deviation adjustment shaft is linked with the first focal adjustment lens system; and the focal adjustment shaft is linked with the second focal adjustment lens system and the dioptric deviation adjustment shaft.

The fourth binoculars according to the present invention comprises: a first focal adjustment lens system; a second focal adjustment lens system; a focal adjustment shaft that performs a focal adjustment by causing the first focal adjustment lens system and the second focal adjustment lens system to move along optical axes thereof; and a dioptric deviation adjustment shaft that performs a dioptric deviation adjustment by causing the first focal adjustment lens system to move along the optical axis, and: the dioptric deviation adjustment shaft is linked with the first focal adjustment lens system; the focal adjustment shaft is linked with the second focal adjustment lens system and the dioptric deviation adjustment shaft; the dioptric deviation adjustment shaft causes the first focal adjustment lens system to move by rotating without moving along an axial direction during the dioptric deviation adjustment; and the focal adjustment shaft moves together with the dioptric deviation adjustment shaft along the axial direction to perform the focal adjustment.

The fifth binoculars according to the present invention is preferably achieved by that in the second or the fourth binoculars: the focal adjustment shaft is set parallel to the dioptric deviation adjustment shaft.

The sixth binoculars according to the present invention is preferably achieved by that in the second, the third, the fourth or the fifth binoculars: a focal adjustment operating unit that accepts an operation for executing the focal adjustment from outside, and a dioptric deviation adjustment operating unit that accepts an operation for executing the dioptric deviation adjustment from the outside, are further provided; and: the focal adjustment shaft is linked with the dioptric deviation adjustment shaft without hindering rotation of the dioptric deviation adjustment shaft; an axial direction of the focal adjustment shaft and an axial direction of the dioptric deviation adjustment shaft are parallel to the optical axes; the focal adjustment shaft and the dioptric deviation adjustment shaft move along the axial directions in response to an operation of the focal adjustment operating unit to move the first focal adjustment lens system and the second focal adjustment lens system along the optical axes; and the dioptric deviation adjustment shaft rotates without moving along the axial direction in response to an operation of the dioptric deviation operation unit to move the first focal adjustment lens system along the optical axis.

The seventh binoculars according to the present invention is preferably achieved by that in the fourth or the sixth binoculars: the dioptric deviation adjustment shaft and the first focal adjustment lens system are linked with each other via a joint; a male screw is formed at an external circumference of the dioptric deviation adjustment shaft; the joint includes a female screw that interlocks with the male screw; and the joint is allowed to move along the optical axis as rotation of the dioptric deviation adjustment shaft moves the female screw from the male screw.

The eighth binoculars according to the present invention is preferably achieved by that in the third or the fifth binoculars: the focal adjustment shaft includes a first linking member and a second linking member that connect the focal adjustment shaft with the dioptric deviation adjustment shaft and the second focal adjustment lens system respectively; and front ends of the first linking member and the second linking member are each formed in a hook shape; opening of the hook shape of each of the front ends is facing in a predetermined rotational direction with regard to the focal adjustment shaft.

The ninth binoculars according to the present invention is preferably achieved by that in the eighth binoculars: at least one of the first linking member and the second linking member of the focal adjustment shaft includes a means for inhibiting rotation of the focal adjustment shaft.

The tenth binoculars according to the present invention is preferably achieved by that in the second binoculars: two ends of the focal adjustment shaft and one end of the dioptric deviation adjustment shaft are each inserted at a bearing hole formed in the bridge casing and supported at the bearing hole.

The eleventh binoculars according to the present invention is preferably achieved by that in the third or the fourth binoculars: the first focal adjustment lens and the second focal adjustment lens are respectively housed inside a first lens barrel and a second lens barrel; the focal adjustment shaft and the dioptric deviation adjustment shaft are housed inside a bridge casing set between the first lens barrel and the second lens barrel; and two ends of the focal adjustment shaft and one end of the dioptric deviation adjustment shaft are each inserted at bearing hole formed in the bridge casing and supported at the bearing hole.

The twelfth binoculars according to the present invention is preferably achieved by that in the seventh binoculars: a guide mechanism for guiding movement along the optical axis is provided at the joint; and the joint is constituted of at least two separate members so as to absorb an error manifesting with regard to a distance between an axis of the guide mechanism and an axis of the dioptric deviation adjustment shaft.

DESCRIPTION OF PREFERRED EMBODIMENT(S)

The preferred embodiments of the present invention are now explained in reference to the drawings.

First Embodiment

Figure 1:
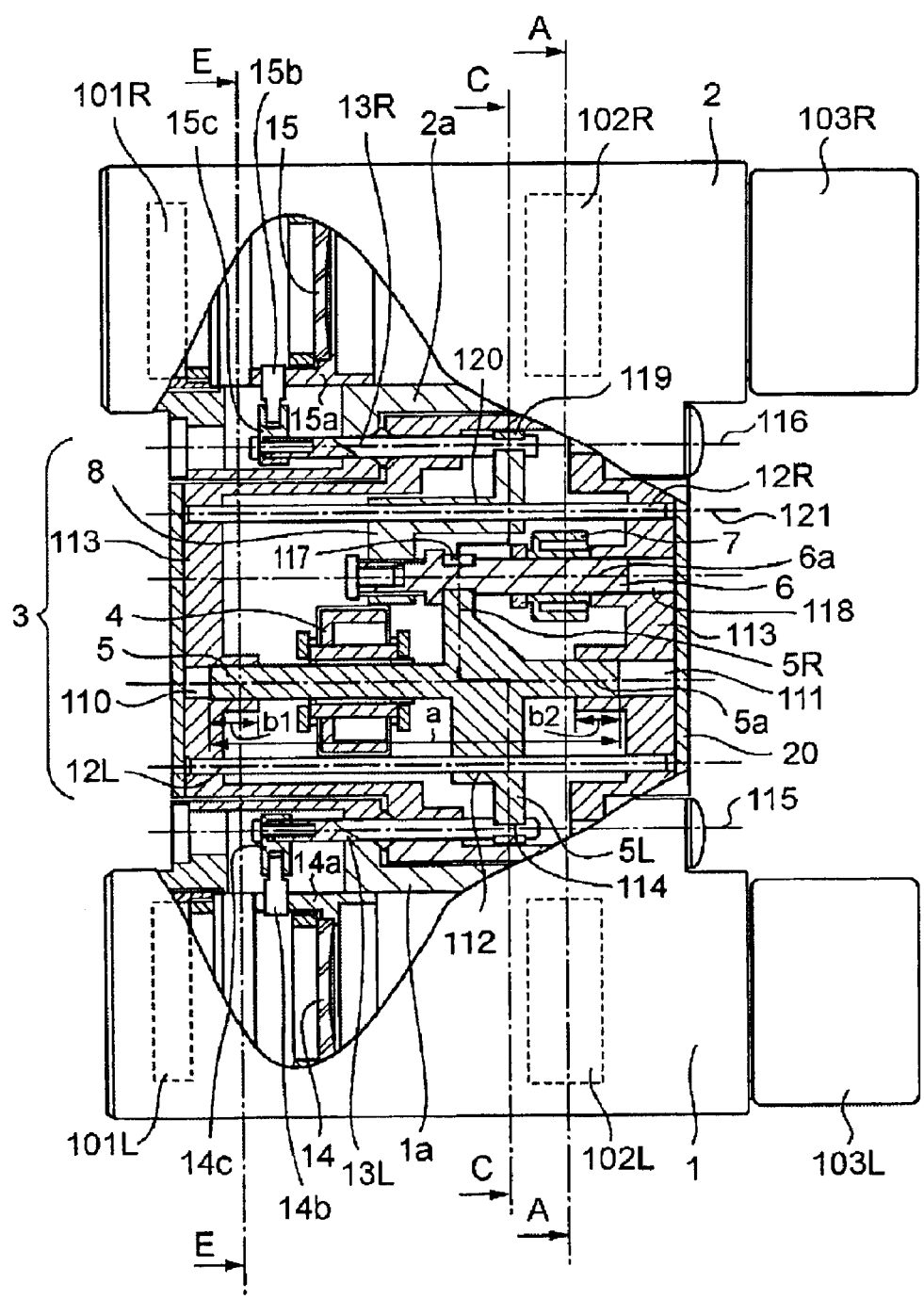
FIG. 1 shows a cutaway sectional view showing the internal structure of the binoculars achieved in the first embodiment of the present invention.
Figure 10:
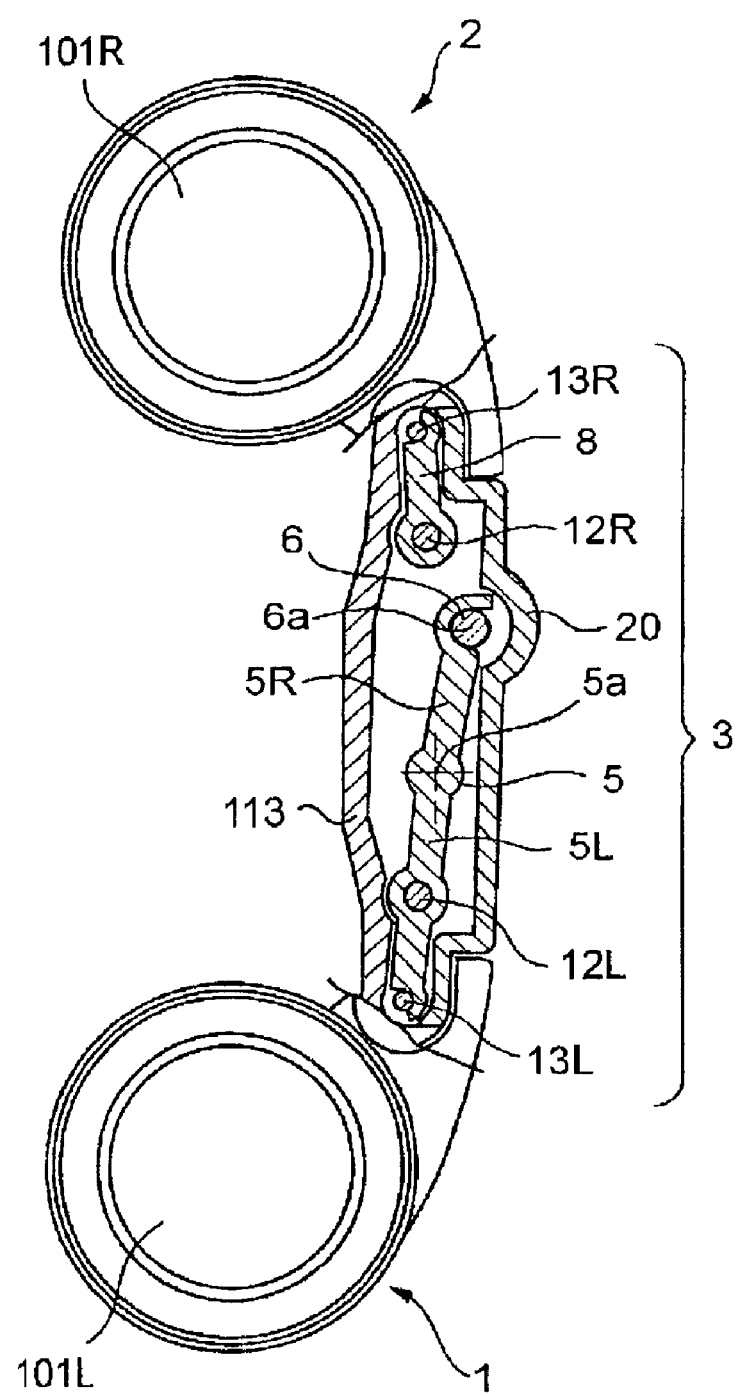
FIG. 10 shows a sectional view of the binoculars in FIG. 1 taken along C—C.
Figure 13:
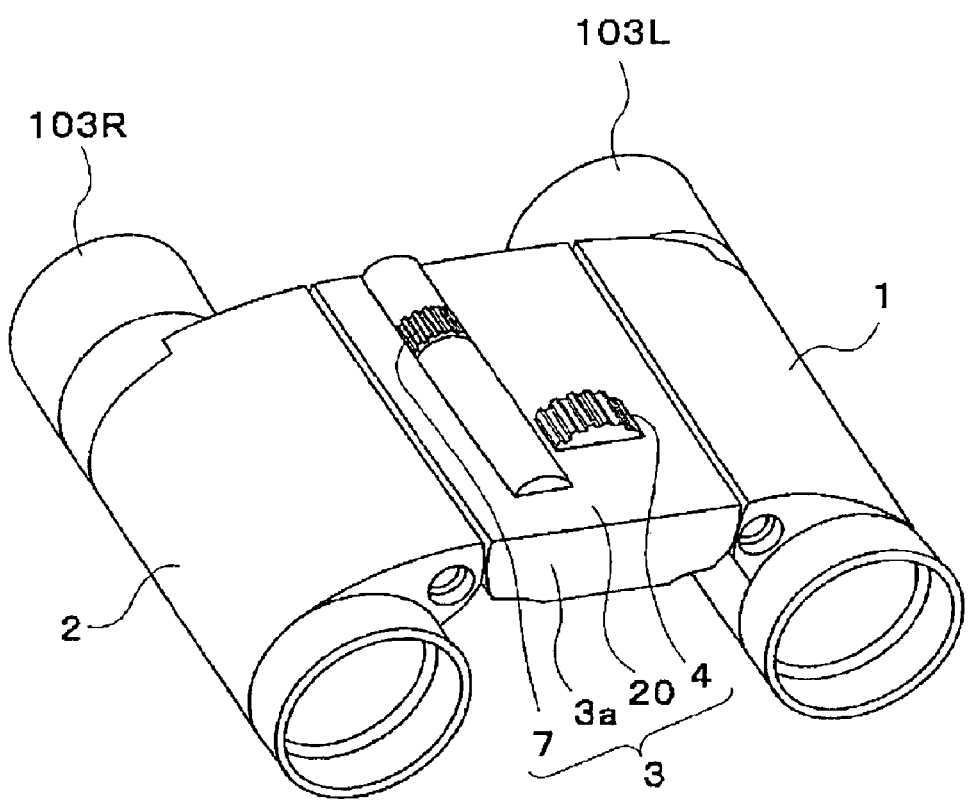
FIG. 13 shows a perspective showing an external appearance of the binoculars in FIG. 1.

First, the binoculars achieved in a first embodiment are explained in reference to FIGS. 1, 10 and 13. The binoculars in the first embodiment include a left lens body 1, a right lens body 2 and a bridge 3 linking the left and right lens bodies 1 and 2, as shown in FIGS. 1 and 10. The lens body 1 includes an objective lens 101L, a focal adjustment lens 14, an image erect prism 102L and a lens barrel 1a housing them all. The focal adjustment lens 14 is supported by a lens frame 14a. Likewise, the lens body 2 includes an objective lens 101R, a focal adjustment lens 15, an image erect prism 102R and a lens barrel 2a housing them all. The focal adjustment lens 15 is supported by a lens frame 15a. On the eyepiece side of the left and right lens bodies 1 and 2, eyepiece lens units 103L and 103R within which eyepiece lenses are internally provided are respectively mounted.

One end of a focus shaft (a linking shaft) 13L is inserted at the lens body 1 and is linked with the focal adjustment lens frame 14a via linking members 14b and 14c. The other end of the focus shaft 13L is inserted at the bridge 3. Likewise, one end of a focus shaft 13R is inserted at the right lens body 2 and is linked with the focal adjustment lens frame 15a via linking members 15b and 15c. The other end of the focus shaft 13R is inserted at the bridge 3. Axes 115 and 116 of the focus shafts 13L and 13R extend parallel to the optical axes of the lens bodies 1 and 2. The left and right lens bodies 1 and 2 are capable of rotating around the axes 115 and 116 respectively to allow the binoculars to be folded.

The bridge 3 includes a bridge casing 113 and the bridge cover 20 covering the bridge casing 113, and within the bridge 3, a focal adjustment shaft 5, a focal adjustment knob (a focal adjustment operating unit) 4, a dioptric deviation adjustment shaft 6, a dioptric deviation adjustment knob (a dioptric deviation adjustment operating unit) 7, guide shafts 12L and 12R and a joint 8 are provided. The focal adjustment knob 4 and the dioptric deviation adjustment knob 7 are exposed to the outside through the openings formed at the bridge cover 20 to allow the user to operate them.

Figure 7:
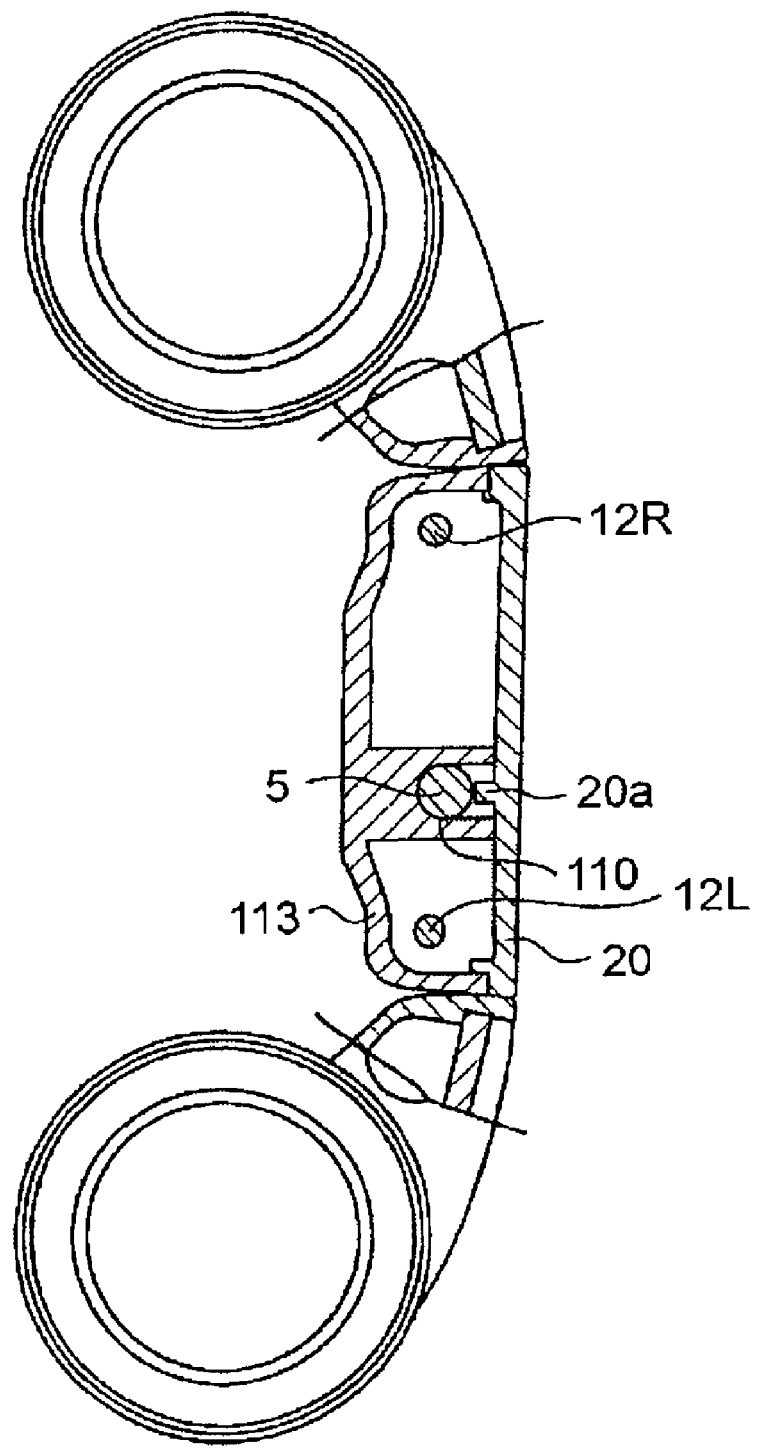
FIG. 7 shows a sectional view of the binoculars in FIG. 1 taken along E—E.

The focal adjustment shaft 5 includes an axis 5a and blades 5L and 5R distending to the left and the right. The axis 5a of the focal adjustment shaft 5 extends parallel to the optical axes of the lens bodies 1 and 2 and the axes 115 and 116 of the focus shafts 13L and 13R. The two ends of the focal adjustment shaft 5 which are inserted at bearing holes 110 and 111 provided in the bridge casing 113 are supported at the bearing holes 110 and 111. Either of the bearing holes 110 and 111 (the bearing hole 110 in this example) has a semicircular section so as to form a notch (opening) which allows an end of the focal adjustment shaft 5 to be inserted perpendicular to the optical axis, as shown in FIG. 7, thereby making it possible to mount the two ends of the focal adjustment shaft 5 at the bearing holes in the bridge casing 113. When the two ends of the focal adjustment shaft 5 are mounted, the movement of the end of the focal adjustment shaft 5 in the direction of the notch is restricted by mounting the bridge cover 20 at the bridge casing 113 and inserting a projection 20a of the bridge cover 20 into the notch. In addition, the length a of the focal adjustment shaft 5 along its axis 5a is set smaller than the length of the bridge casing 113 along the axis 5a in design. It is also ensured in design that lengths b1 and b2 are set so as to allow the ends of the focal adjustment shaft 5 to fit in the bearing holes 110 and 111 in the bridge casing 113. Thus, the focal adjustment shaft 5 is allowed to move inside the bridge casing 113 along the axis 5a and, at the same time, is supported at the bearing holes 110 and 111 over the entire range of movement of the focal adjustment shaft 5. It is to be noted that in a second embodiment illustrated in FIGS. 3, 4, 8 and 9, the diameter of one of the bearing holes in the bridge casing 113 is set larger than the diameter at the ends of the focal adjustment shaft 5 in design. Thus, the focal adjustment shaft 5 can be mounted at the bearing holes in the bridge casing 113 without having to form one of the bearing holes in a semicircular shape with a notch, as in the first embodiment.

A through hole 112 is formed in the left blade 5L of the focal adjustment shaft 5, and the guide shaft 12L passes through the through hole 112. The two ends of the guide shaft 12L are supported by the bridge casing 113. By adopting a structure having the guide shaft 12L passing through the left blade 5L in this manner, rotation of the focal adjustment shaft 5 is inhibited.

A male screw is formed at the external circumference of the focal adjustment shaft 5 and this male screw interlocks with a female screw formed at the internal circumference of the focal adjustment knob 4. While the focal adjustment knob 4 is allowed to rotate, the focal adjustment knob 4 is mounted at the bridge casing 113 so as to prevent it from moving along the axis 5a. Since the rotation of the focal adjustment shaft 5 is inhibited by the guide shaft 12L, the focal adjustment shaft 5 moves along the axis 5a, i.e., along the optical axis, as the focal adjustment knob 4 rotates.

As shown in FIG. 10, the front end of the left blade 5L of the focal adjustment shaft 5 is formed in a hook shape and the hook connects with and retained at an indented portion 114 provided at an end of the focus shaft 13L toward the left lens body 1. Thus, as the focal adjustment shaft 5 moves along the axis 5a in response to the rotation of the focal adjustment knob 4, the focus shaft 13L, too, moves along the axis 115 and the focal adjustment lens frame 14a linked with the end of the focus shaft 13L via the linking members 14b and 14c, too, moves along the optical axis. The focal adjustment for the left lens body 1 is achieved by adopting this structure.

In addition, the front end of the left blade 5L and 13L are connected with each other without hindering the rotation of the focus shaft 13L, and the lens body 1 can be rotated around the axis 115 of the focus shaft 13L to fold the binoculars.

The dioptric deviation adjustment shaft 6 is set parallel to the focal adjustment shaft 5 at the right blade 5R side of the focal adjustment shaft 5. One end of the dioptric deviation adjustment shaft 6 is inserted and supported at a bearing hole 118 formed in the bridge casing 113. As shown in FIG. 10, the front end of the right blade 5R of the focal adjustment shaft 5 is formed in a hook shape, and this hook is connected with and retained an indented portion 117 of the dioptric deviation adjustment shaft 6. As a result, when the focal adjustment shaft 5 moves along the axis 5a, the dioptric deviation adjustment shaft 6, too, moves along the axis 6a.

Figure 5:
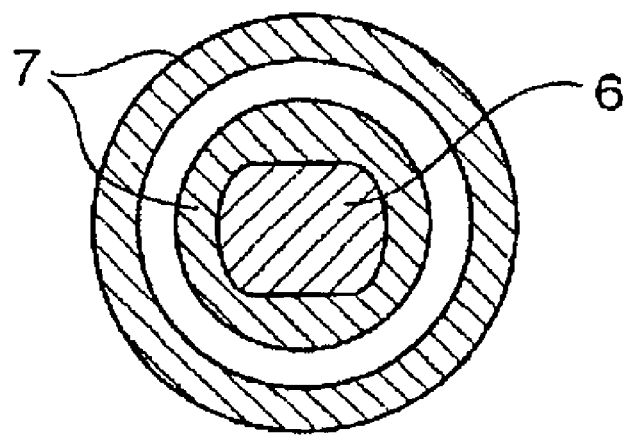
FIG. 5 shows a sectional view taken along A—A, illustrating the spline structure adopted at the dioptric deviation adjustment shaft 6 in the binoculars in FIG. 1.
Figure 6:
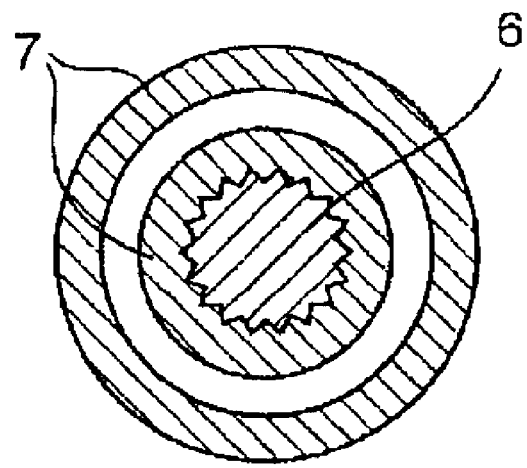
FIG. 6 shows a sectional view taken along A—A, illustrating another spline structure adopted at the dioptric deviation adjustment shaft 6 in the binoculars in FIG. 1.

In addition, the middle portion of the dioptric deviation adjustment shaft 6 and the dioptric deviation adjustment knob 7 are fitted with each other by adopting a spline structure shown in either FIG. 5 or FIG. 6. Thus, the dioptric deviation adjustment shaft 6 is caused to rotate by rotating the dioptric deviation adjustment knob 7. Since the hook at the front end of the right blade 5R and the dioptric deviation adjustment shaft 6 connect with each other without hindering the rotation of the dioptric deviation adjustment shaft 6 in this structure, the dioptric deviation adjustment shaft 6 rotates inside the hook at the front end of the right blade 5R. Since the dioptric deviation adjustment knob 7, which does not move along the axis 6a, is supported by the bridge casing 113 so that it is only allowed to rotate, the dioptric deviation adjustment shaft 6 alone moves along the axis 6a if the right blade 5R travels along the axis 5a and the dioptric deviation adjustment knob 7 does not move along the axis 6a at all. When the dioptric deviation adjustment shaft 6 moves along the axis 6a, the fitted state achieved by the dioptric deviation adjustment shaft 6 and the dioptric deviation adjustment knob 7 is sustained through the spline structure.

A male screw is formed at the external circumference of the dioptric deviation adjustment shaft 6 at the other end, and a female screw to interlock with this male screw is formed at the joint 8. A through hole 120 is formed at the joint 8, and the guide shaft 12R whose axis extends parallel to the optical axes is inserted at the through hole 120. The guide shaft 12R is supported by the bridge casing 113 at its two ends. As a result, the joint 8 is driven as the dioptric deviation adjustment shaft 6 rotates, and the joint 8 travels to the left or the right in FIG. 1 in conformance to the direction of the rotation of the dioptric deviation adjustment shaft 6. Thus, the joint 8 can be moved along the guide shaft 12R, i.e., along the axis 6a. In addition, when the dioptric deviation adjustment shaft 6 travels along the axis 6a, the joint 8, too, travels along the axis 6a.

The front end of the joint 8, which is formed in a hook shape, as shown in FIG. 10, connects with and is retained at an indented portion 119 formed at the end of the focus shaft 13R toward the right lens body 2.

Thus, as the user rotates the dioptric deviation adjustment knob 7, to rotate the dioptric deviation adjustment shaft 6, the joint 8 travels along the axis 6a and the focus shaft 13R, too, is allowed to move along the axis 116. As a result, the focal adjustment lens frame 15a linked to the end of the focus shaft 13R via the linking members 15b and 15c, too, moves along the optical axes. This allows the focal adjustment lens 15 of the right lens body 2 alone to move relative to the focal adjustment lens 14 of the left lens body 1 to achieve a diopter adjustment.

In addition, if the rotation of the focal adjustment knob 4 causes the focal adjustment shaft 5 to move along the axis 5a, the dioptric deviation adjustment shaft 6 which is connected with the right blade 5R as explained above, too, travels along the axis 6a causing the joint 8 to move along the axis 6a as well. As a result, the focus shaft 13R, too, travels along the axis 116, which, in turn, allows the focal adjustment lens frame 15a linked with the focus shaft 13R to move along the optical axes. Thus, the focal adjustment lens 15 at the right lens body 2 is allowed to move along the optical axes to achieve a focal adjustment. By rotating the focal adjustment knob 4 and thus moving the focal adjustment shaft 5 along the axis 5a, the focal adjustment lenses 14 and 15 at the left and right lens bodies 1 and 2 move as one along the optical axes to perform a focal adjustment for the left and right lens bodies 1 and 2 at the same time.

In addition, the front end of the joint 8 and the focus shaft 13R are connected with each other without hindering the rotation of the focus shaft 13R, and the lens body 2 can be rotated around the axis 116 of the focus shaft 13R to fold the binoculars.

As described above, the user rotates the focal adjustment knob 4 to perform a focal adjustment by moving the focal adjustment lenses 14 and 15 at the left and right lens bodies 1 and 2 at the same time along the optical axes in the binoculars in the first embodiment. In addition, the user rotates the dioptric deviation adjustment knob 7 to perform a diopter adjustment by moving the focal adjustment lens 15 of the right lens body 2 alone along the optical axes. The focal adjustment shaft 5 and the dioptric deviation adjustment shaft 6 are separate from each other in the structure adopted in the binoculars in the embodiment and the dioptric deviation adjustment shaft 6 is not allowed to move along the optical axes when the dioptric deviation adjustment operating unit (the dioptric deviation adjustment knob 7) is operated. Consequently, the range over which the focal adjustment shaft 5 is allowed to move along the axial direction is not determined in conformance to the quantity of the diopter adjustment achieved through the dioptric deviation adjustment shaft 6, i.e., the distance over which the joint 8 moves along the optical axis relative to the dioptric deviation adjustment shaft 6. As a result, the distance over which the focal adjustment shaft 5 moves to achieve focal adjustment is not affected by the state of the dioptric deviation adjustment and the shortest focus distance remains unchanged. Furthermore, since the focal adjustment shaft 5 is allowed to move over the entire length of the bridge casing 113 along the axis 5a, the focal adjustment shaft 5 is allowed to move over a wide range to provide binoculars achieving a small shortest focus distance. The axial direction of the focal adjustment shaft 5 and the axial direction of the dioptric deviation adjustment shaft 6 are not overlapped with each other and parallel to each other. When the focal adjustment shaft 5 moves, a relative distance between the focal adjustment shaft 5 and the dioptric deviation adjustment shaft 6 extending along the optical axis is kept unchanged.

In addition, since the focal adjustment shaft 5 is supported at the two ends at the bearing holes 110 and 111 formed in the bridge casing 113 instead of adopting a structure in which it is supported through a screw interlock, the operational play to the left and the right of the shaft, in particular, is caused only by the difference between the diameters of the bearing holes 110 and 111 and the diameter of the focal adjustment shaft 5, which is not as significant as play attributable to the presence of screws. Furthermore, while one end of the dioptric deviation adjustment shaft 6 is supported through a screw interlock which connects the end of the dioptric deviation adjustment shaft 6 to the joint 8, the other end is supported at the bearing hole 118 of the bridge casing 113, and thus, the operational play is not as significant as that of a shaft having the two ends thereof supported through a screw interlock. Since the focal adjustment shaft 5 and the dioptric deviation adjustment shaft 6 do not play much during operation, the focal adjustment shaft 5 and the dioptric deviation adjustment shaft 6 are not deflected to the left and the right excessively during a focal adjustment, which makes it possible to provide binoculars that achieve a reduction in the difference between the distances traveled by the left and right focal adjustment lenses 14 and 15 caused by operational play.

Figure 11:
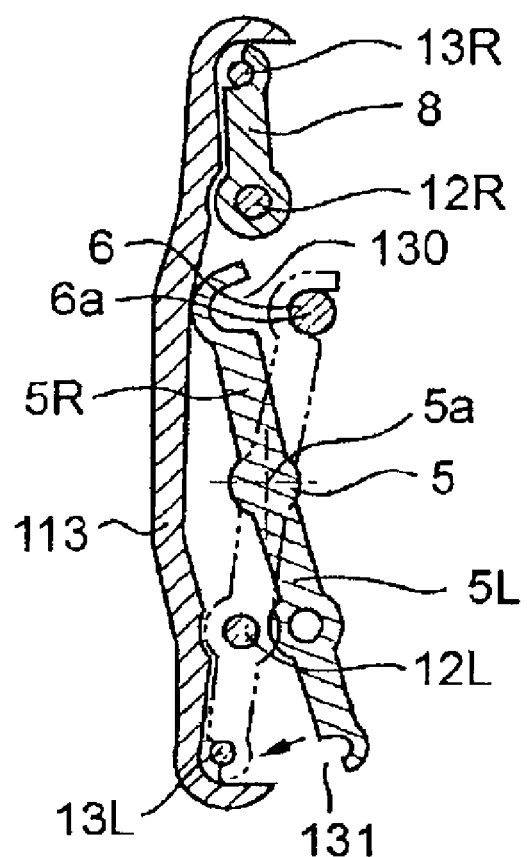
FIG. 11 shows a sectional view of the bridge 3 during the process of assembling the binoculars in FIG. 1 taken along C—C.

The operational play of the focal adjustment shaft 5 is further reduced in the binoculars in the first embodiment by adopting the following structure. If the length a of the focal adjustment shaft 5 along the axis 5*a* is large, the length over which the focal adjustment shaft 5 is screw-fitted at the bearing holes 110 and 111, i.e., b=b1+b2 (see FIG. 1) can be increased to minimize the extent of the operational play. However, the length a of the focal adjustment shaft 5 must be set so as to allow the procedure of inserting one end of the focal adjustment shaft 5 through the bearing hole 110 or 111 with a notch (the bearing hole 110 in this example) via the notch from the direction extending perpendicular to the optical axis and then inserting the end on the opposite side at the other bearing hole 111 with parallel moving by rotating the focal adjustment knob 4 to be performed during the binocular assembly process. If the dioptric deviation adjustment shaft 6 is already connected with the focal adjustment shaft 5 when the focal adjustment shaft 5 is inserted, the restrictions imposed with regard to the axial movement become more rigorous compared with the restrictions imposed when the focal adjustment shaft 5 alone is inserted by itself and, as a result, the length a of the focal adjustment shaft 5 must be reduced. Accordingly, the front ends of the blades 5L and 5R at the focal adjustment shaft 5 are formed in a hook shape, with the hooks opening along the clockwise advancing direction around the axis 5*a*, as shown in FIG. 11. During the assembly process, the focal adjustment shaft 5 is mounted at the bearing holes 110 and 111 on its own, and then the focal adjustment shaft 5 is rotated counterclockwise around the axis 5*a* to withdraw the blades 5L and 5R of the focal adjustment shaft 5 (the focal adjustment shaft 5 is in the state indicated by the solid line in FIG. 11). In this state, the dioptric deviation adjustment shaft 6 and the focus shaft 13L are inserted as illustrated in FIG. 11, and then, by rotating the focal adjustment shaft 5 clockwise around the axis 5*a*, the hooks formed at the front ends of the left and right blades 5L and 5R are allowed to connect with the dioptric deviation adjustment shaft 6 and the focus shaft 13L (the focal adjustment shaft 5 is in the state indicated by the 2-point chain line in FIG. 11). Subsequently, as the guide shaft 12L is inserted at the left blade 5L, the rotation of the focal adjustment shaft 5 becomes inhibited. As described above, since the focal adjustment shaft 5 can be connected with the dioptric deviation adjustment shaft 6 and the focus shaft 13L after it is mounted at the bridge casing 113 in the binoculars achieved in the embodiment, the focal adjustment shaft 5 can be mounted at the bridge casing 113 by itself. Consequently, the length a of the focal adjustment shaft 5 can be increased to realize a focal adjustment shaft 5 with less operational play. As a result, binoculars in which the operational play causes only a small difference between distances traveled by the left and right focal adjustment lenses 14 and 15 can be provided.

Figure 2:
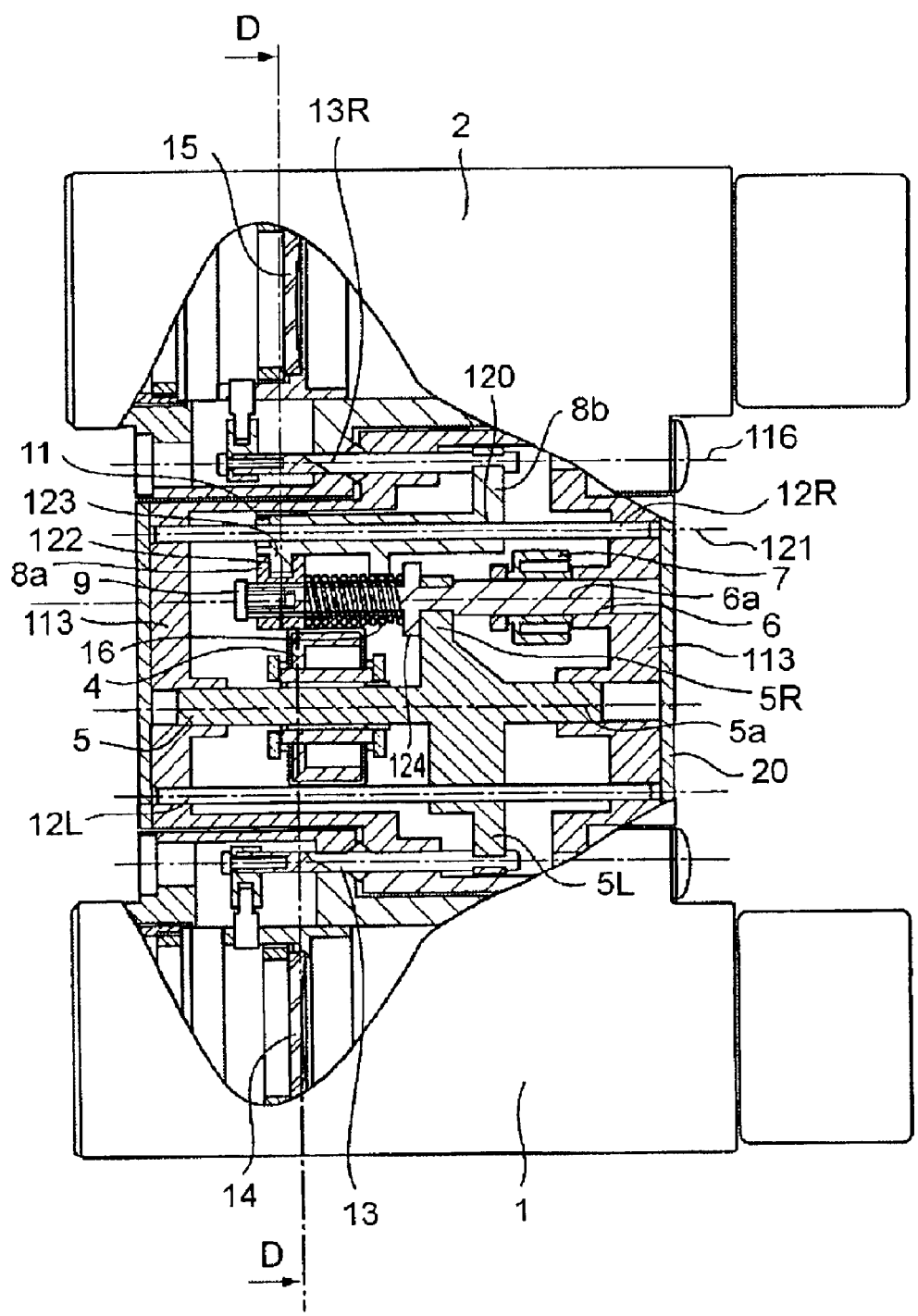
FIG. 2 shows a cutaway sectional view of the binoculars in the first embodiment of the present invention adopting a structure achieved by forming the joint with two members and mounting a spring at the dioptric deviation adjustment shaft.

In addition, the operational play at the joint 8 may be reduced by forming the joint 8 of two members, a joint 8*a* and a joint 8*b*, as shown in FIG. 2. The structure shown in FIG. 2 is now explained. The distance between the axis 6*a* of the dioptric deviation adjustment shaft 6 and the axis 121 of the guide shaft 12R varies among individual products in reality due to parts production errors. Such inconsistency must be corrected in the structure illustrated in FIG. 1 by setting the diameter of the through hole 120 at the joint 8 through which the guide shaft 12R passes larger than the diameter of the guide shaft 12R by a degree corresponding to the degree to which the error with regard to the distance between the axes needs to be corrected to create play along the radial direction or by allowing significant play at the screws interlocking the dioptric deviation adjustment shaft 6 and the joint 8. However, the operational play of the joint 8 increases in either case, which results in deflection of the joint 8 to the left and the right of the axis 121 creating a difference between the distances traveled by the left and right focal adjustment lenses 14 and 15.

Figure 12:
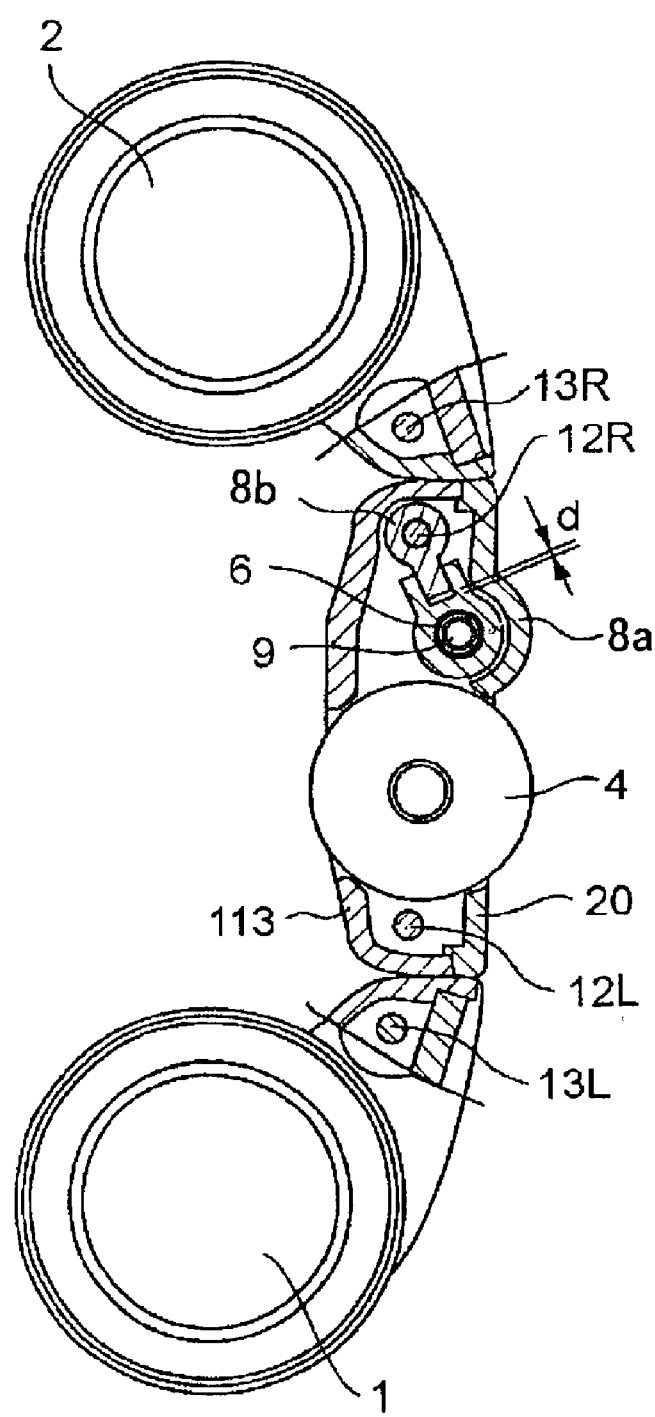
FIG. 12 shows a sectional view of the binoculars in FIG. 2 taken along D—D.

Accordingly, the joint 8 is constituted by using two parts, i.e., the joint 8*a* and the joint 8*b*, to achieve a structure which allows the position of the area over which the joint 8*a* and the joint 8*b* are linked with each other to be adjusted in the direction extending along the distance between the axis 6*a* of the dioptric deviation adjustment shaft 6 and the axis 121 of the guide shaft 12R, as illustrated in FIGS. 2 and 12. Namely, an indented portion 122 of the joint 8*a* toward the dioptric deviation adjustment shaft is fitted with a projecting portion 123 of the joint 8*b* toward the guide shaft 12R, with the fitting length set in design so as to tolerate an error d along the distance between the axis 6*a* of the dioptric deviation adjustment shaft 6 and the axis 121 of the guide shaft 12R. As a result, the error with regard to the distance between the axis 6*a* of the dioptric deviation adjustment shaft 6 and the axis 121 of the guide shaft 12R can be absorbed at the area where the joints 8*a* and 8*b* are fitted with each other to eliminate the need to set a large diameter for the through hole 120 through which the guide shaft 12R passes and the like, which, in turn, makes it possible to manufacture the parts based upon the diameter of the through hole 120 set without taking into consideration the correction quantity necessary for correcting the error in the distance between the axes and the value representing the screw interlock play. Consequently, the play in the joints 8*a* and 8*b* to the left and the right of the axis 121 is reduced to provide binoculars achieving a reduction in the difference between the distances traveled by the left and right focal adjustment lenses 14 and 15.

While the joint 8*b*, which has an odd-looking shape, can be manufactured through molding, the diameter of the through hole 120 needs to incline along the axis 121 so as to create a draft that allows the molded joint to be eased out of the molding die. Accordingly, in order to minimize operational play from occurring at the joint 8b as a result of the increase in the diameter of the through hole 120 due to the presence of the draft, a ring 11, which fits with the guide shaft 12R may be mounted at one end of the through hole 120. The use of such a ring further reduces the operational play of the joint 8b.

A spring 16 may be inserted between a projection 124 formed at the external circumference of the dioptric deviation adjustment shaft 6 and the joint 8a, as shown in FIG. 2, in order to prevent the screw play occurring over the area where the dioptric deviation adjustment shaft 6 and the joint 8a are connected through a screw interlock. Since the spring 16 applies a force to the joint 8a toward the end of the dioptric deviation adjustment shaft 6, the female screw at the joint 8a is pressed against the male screw provided at the external circumference of the dioptric deviation adjustment shaft 6 along the axis 6a to suppress the screw play. Consequently, the extent of the operational play at the joint 8a is reduced.

Second Embodiment

Figure 3:
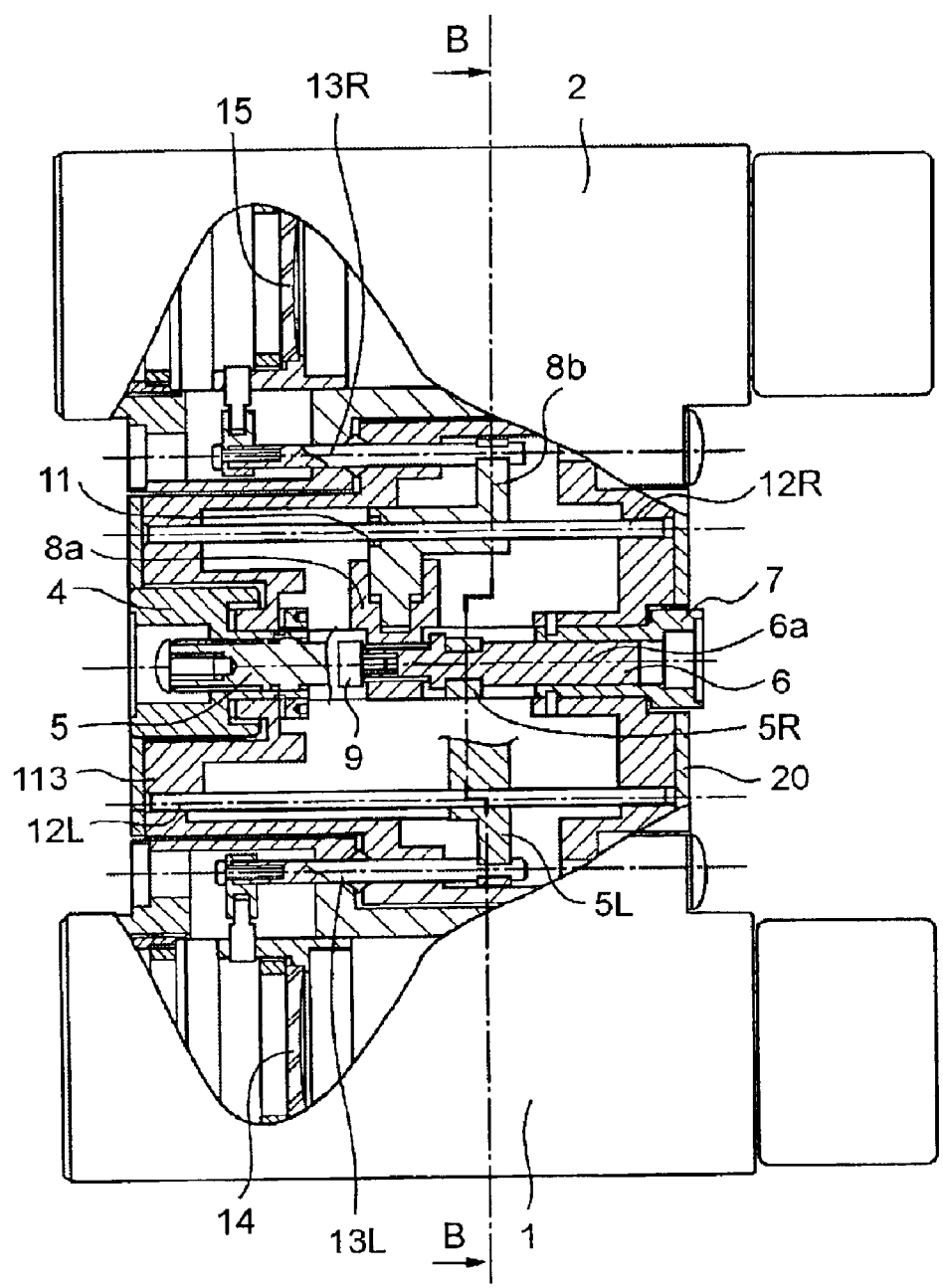
FIG. 3 shows a cutaway sectional view showing the internal structure of the binoculars achieved in the second embodiment of the present invention.
Figure 4:
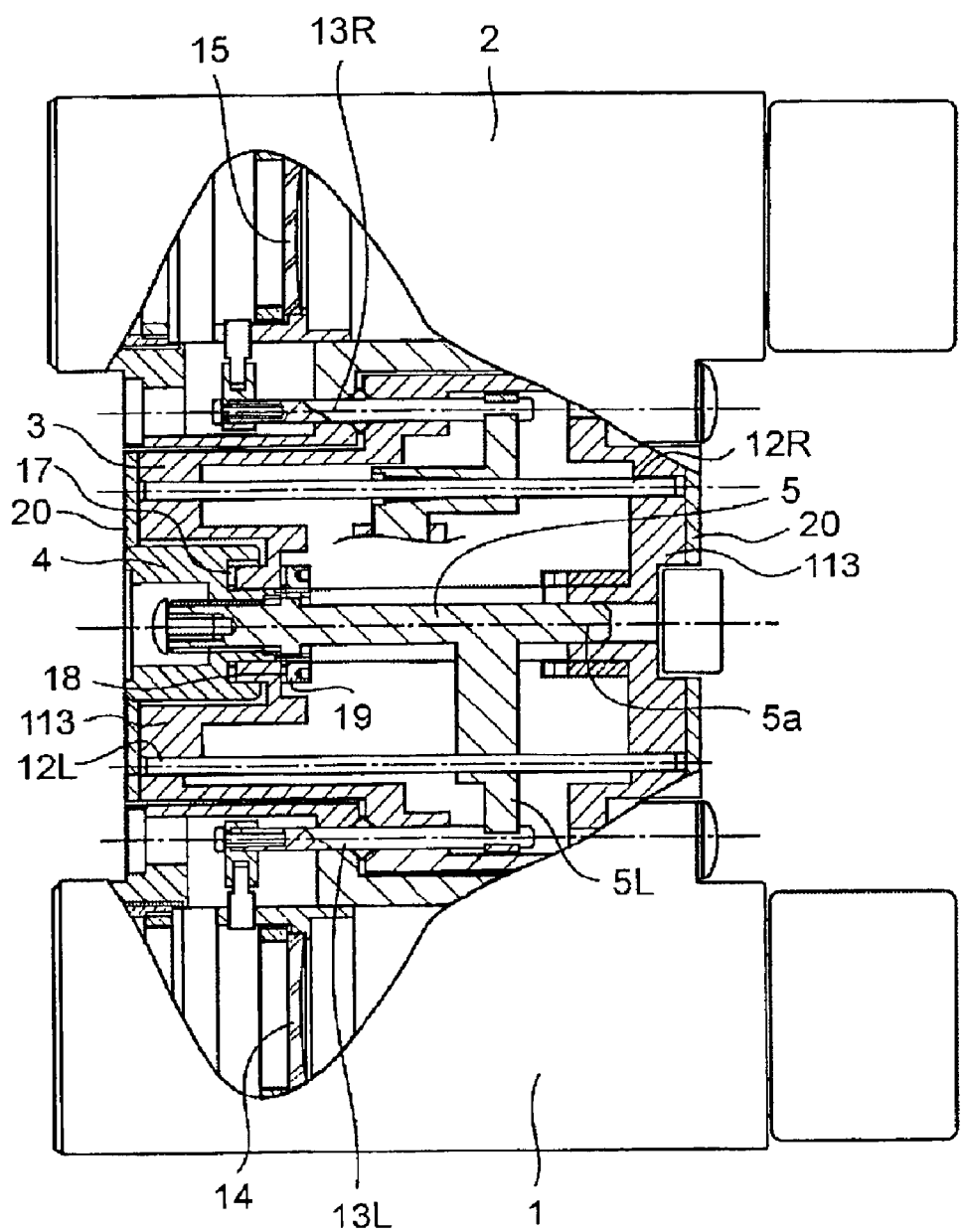
FIG. 4 shows a cutaway sectional view taken at a different position, showing the internal structure adopted in the second embodiment of the present invention.
Figure 8:
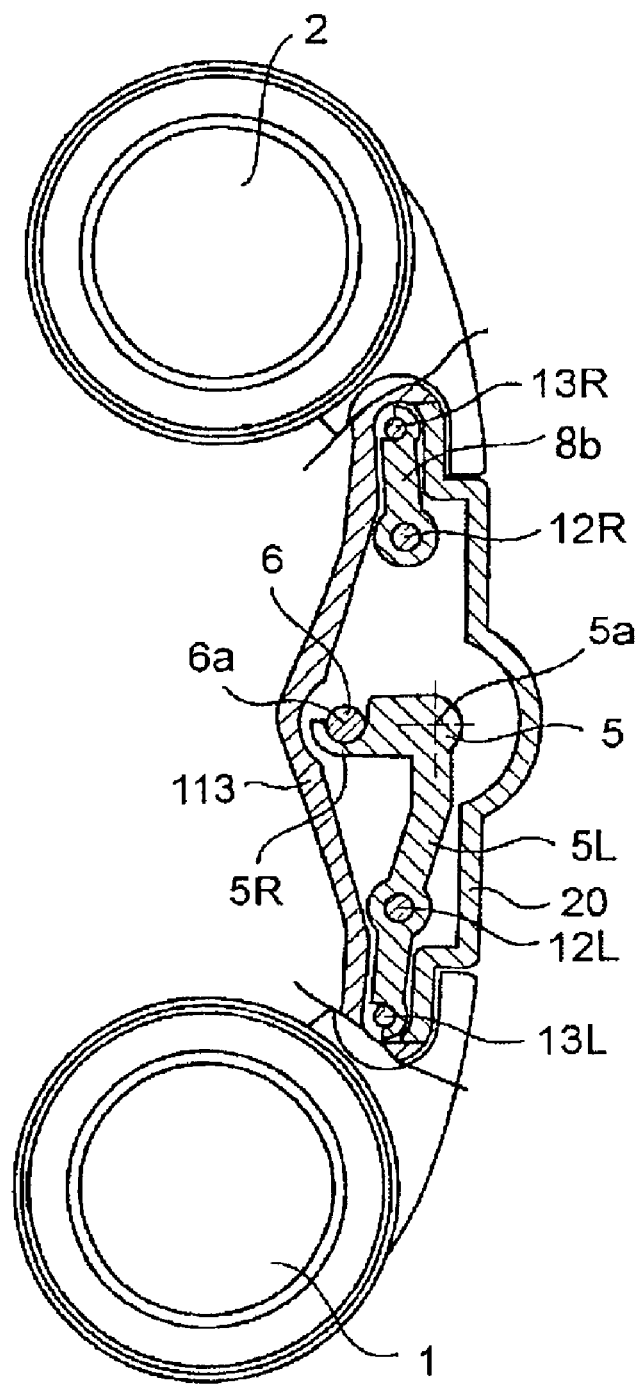
FIG. 8 shows a sectional view of the binoculars in FIG. 3 taken along B—B.
Figure 9:
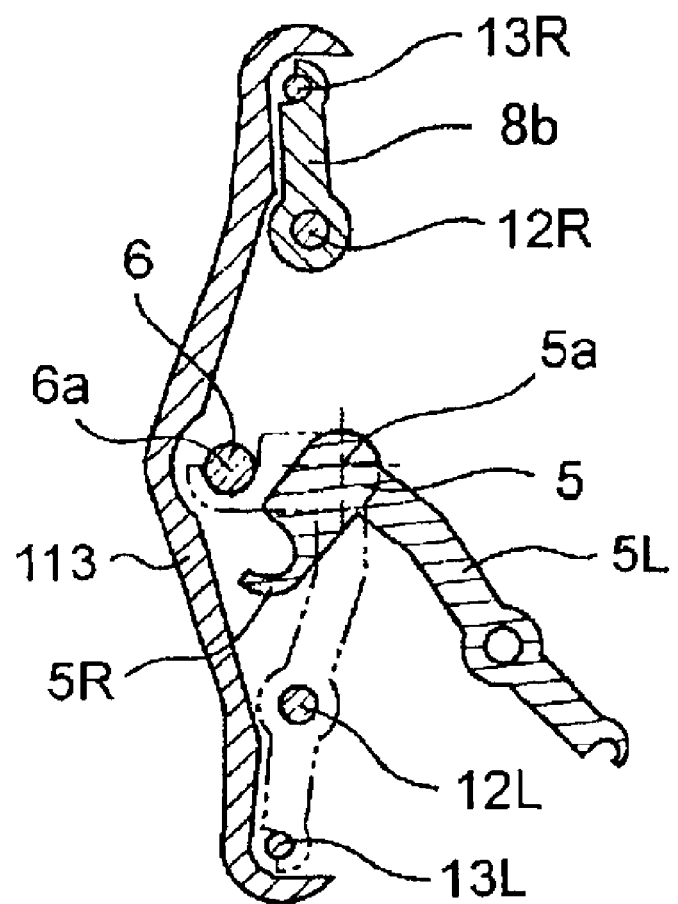
FIG. 9 shows a sectional view of the bridge 3 during the process of assembling the binoculars in FIG. 3 taken along B—B.

Next, the binoculars achieved in a second embodiment of the present invention is explained in reference to FIGS. 3, 4 and 8.

While the basic structure adopted in the binoculars in the second embodiment are similar to those of the binoculars in the first embodiment, the second embodiment differs from the first embodiment in that the focal adjustment shaft 5 is provided at the center of the bridge casing 113, as shown in FIGS. 3 and 4, with the dioptric deviation adjustment shaft 6 provided under the focal adjustment shaft 5. Accordingly, while the left blade 5L of the focal adjustment shaft 5 is formed in a shape similar to that of the left blade in the first embodiment, the right blade 5R extends downward from the focal adjustment shaft 5 to connect with the dioptric deviation adjustment shaft 6, as shown in FIG. 8. As in the first embodiment, the openings of the hooks formed at the front ends of the left and right blades 5R and 5L are set along the advancing direction of a clockwise rotation of the focal adjustment shaft 5 around the axis 5a. In addition, the focal adjustment knob 4 is provided at the end of the bridge casing 113 toward the object and the dioptric deviation adjustment knob 7 is provided at the end of the bridge casing 113 toward the eyepieces. The joint connecting the dioptric deviation adjustment shaft 6 and the focus shaft 13R is constituted of two members, the joint 8a and the joint 8b as in the structure illustrated in FIG. 2, which has been explained in reference to the first embodiment, to absorb the error with regard to the distance between the axes.

By providing the dioptric deviation adjustment shaft 6 under the focal adjustment shaft 5, the width of the focal adjustment shaft 5, which includes the left and right blades 5R and 5L is reduced in the binoculars in the second embodiment. For this reason, if the focal adjustment shaft 5 is rotated counterclockwise around the axis 5a when mounting the focal adjustment shaft 5 at the bridge casing 113 during the binocular assembly process, the blades 5L and 5R of the focal adjustment shaft 5 can be withdrawn further (the focal adjustment shaft 5 is in the state indicated by the solid line in FIG. 9). As a result, the dioptric deviation adjustment shaft 6 and the focus shaft 13L can be inserted with ease. Then, by rotating the focal adjustment shaft 5 clockwise around the axis 5a, the hooks formed at the front ends of the left and right blades 5L and 5R are allowed to connect with the dioptric deviation adjustment shaft 6 and the focus shaft 13L (the focal adjustment shaft 5 is in the state indicated by the 2-point chain line in FIG. 9), and the guide shaft 12L is inserted at the left blade 5L to prevent the focal adjustment shaft 5 from rotating around the axial direction. The binoculars in the second embodiment, which allow the blades 5L and 5R of the focal adjustment shaft 5 to withdraw further during the assembly process, facilitate the assembly work, achieving an advantage of higher production efficiency. Since other structural features and functions are similar to those of the binoculars in the first embodiment, their explanation is omitted.

In the second embodiment, the focal adjustment shaft 5 and the dioptric deviation adjustment shaft 6 are set in a direction roughly or substantially perpendicular to a plane including the first lens barrel and the second lens barrel (a horizontal plane of the bridge casing 113 or a horizontal plane of the binoculars itself).

It is to be noted that while the guide shaft 12L. is inserted at the left blade 5L to inhibit rotation of the focal adjustment shaft 5 in the first and second embodiments explained above, it goes without saying that the rotation of the focal adjustment shaft 5 may be inhibited by adopting another structure. For instance, a guide groove may be provided at a portion of the bridge casing 113 and part of the left blade 5L may be connected and retained at the guide groove to prevent the focal adjustment shaft 5 from rotating. Alternatively, a projection may be formed at a portion of the bridge casing 113 or the bridge cover 20 to retain part of the left blade 5L and/or right blade 5R with the inhibit to prevent rotation.

While the guide shaft 12R is utilized as a mechanism for guiding the joint 8 or 8b in the first and second embodiments explained above, any other mechanism such as a guide groove that connects with the end of the joint 8 or 8b may be utilized instead of the guide shaft 12R.

In addition, while the dioptric deviation adjustment shaft 6 causes the focal adjustment lens 15 to move in order to perform a diopter adjustment in the binoculars achieved in the first and the second embodiments, the focal adjustment lens 14 instead of the focal adjustment lens 15 may be caused to move.

The above described embodiments are examples, and various modifications can be made without departing from the spirit and scope of the invention.

What is claimed is:

1. Binoculars comprising:
    a first focal adjustment lens system;
    a second focal adjustment lens system;
    a focal adjustment shaft that performs a focal adjustment by causing the first focal adjustment lens system and the second focal adjustment lens system to move along optical axes thereof; and
    a dioptric deviation adjustment shaft that performs a dioptric deviation adjustment by causing the first focal adjustment lens system to move alone the optical axis, wherein
    the focal adjustment shaft is set parallel to the dioptric deviation adjustment shaft;
    the dioptric deviation adjustment shaft is linked with the first focal adjustment lens system;
    the focal adjustment shaft is linked with the second focal adjustment lens system and the dioptric deviation adjustment shaft;
    the focal adjustment shaft includes a first linking member and a second linking member that connect the focal adjustment shaft with the dioptric deviation adjustment shaft and the second focal adjustment lens system respectively; and at least one of the first linking member and the second linking member of the focal adjustment shaft includes a means for inhibiting rotation of the focal adjustment shaft.

2. Binoculars according to claim 1, wherein:

front ends of the first linking member and the second linking member are each formed in a hook shape; and the opening of the hook shape of each of the front ends is facing in a predetermined rotational direction with regard to the focal adjustment shaft.

3. Binoculars comprising:

a first focal adjustment lens system;

a second focal adjustment lens system;

a focal adjustment shaft that performs a focal adjustment by causing the first focal adjustment lens system and the second focal adjustment lens system to move along optical axes thereof; and a dioptric deviation adjustment shaft that performs a dioptric deviation adjustment by causing the first focal adjustment lens system to move along the optical axis, wherein the dioptric deviation adjustment shaft is linked with the first focal adjustment lens system;

the focal adjustment shaft is linked with the second focal adjustment lens system and the dioptric deviation adjustment shaft;

the dioptric deviation adjustment shaft causes the first focal adjustment lens system to move by rotating without moving alone an axial direction during the dioptric deviation adjustment;

the focal adjustment shaft moves together with the dioptric deviation adjustment shaft along the axial direction to perform the focal adjustment;

the focal adjustment shaft is set parallel to the dioptric deviation adjustment shaft;

the focal adjustment shaft includes a first linking member and a second linking member that connect the focal adjustment shaft with the dioptric deviation adjustment shaft and the second focal adjustment lens system respectively; and at least one of the first linking member and the second linking member of the focal adjustment shaft includes a means for inhibiting rotation of the focal adjustment shaft.

4. Binoculars according to claim 3, wherein:

front ends of the first linking member and the second linking member are each formed in a hook shape; and the opening of the hook shape of each of the front ends is facing in a predetermined rotational direction with regard to the focal adjustment shaft.

5. Binoculars comprising:

a first focal adjustment lens system;

a second focal adjustment lens system;

a focal adjustment shaft that performs a focal adjustment by causing the first focal adjustment lens system and the second focal adjustment lens system to move along optical axes thereof; and a dioptric deviation adjustment shaft that performs a dioptric deviation adjustment by causing the first focal adjustment lens system to move along the optical axis, wherein the focal adjustment shaft is set parallel to the dioptric deviation adjustment shaft;

the dioptric deviation adjustment shaft is linked with the first focal adjustment lens system;

the focal adjustment shaft is linked with the second focal adjustment lens system and the dioptric deviation adjustment shaft;

the focal adjustment shaft includes a first linking member and a second linking member that connect the focal adjustment shaft with the dioptric deviation adjustment shaft and the second focal adjustment lens system respectively;

front ends of the first linking member and the second linking member are each formed in a hook shape; and the opening of the hook shape of each of the front ends is facing in a predetermined rotational direction with regard to the focal adjustment shaft.

6. Binoculars comprising:

a first focal adjustment lens system;

a second focal adjustment lens system;

a focal adjustment shaft that performs a focal adjustment by causing the first focal adjustment lens system and the second focal adjustment lens system to move along optical axes thereof; and a dioptric deviation adjustment shaft that performs a dioptric deviation adjustment by causing the first focal adjustment lens system to move along the optical axis, wherein the dioptric deviation adjustment shaft is linked with the first focal adjustment lens system;

the focal adjustment shaft is linked with the second focal adjustment lens system and the dioptric deviation adjustment shaft;

the dioptric deviation adjustment shaft causes the first focal adjustment lens system to move by rotating without moving along an axial direction during the dioptric deviation adjustment;

the focal adjustment shaft moves together with the dioptric deviation adjustment shaft along the axial direction to perform the focal adjustment;

the focal adjustment shaft is set parallel to the dioptric deviation adjustment shaft;

the focal adjustment shaft includes a first linking member and a second linking member that connect the focal adjustment shaft with the dioptric deviation adjustment shaft and the second focal adjustment lens system respectively;

front ends of the first linking member and the second linking member are each formed in a hook shape; and the opening of the hook shape of each of the front ends is facing in a predetermined rotational direction with regard to the focal adjustment shaft.

* * * * *

UNITED STATES PATENT AND TRADEMARK OFFICE
CERTIFICATE OF CORRECTION

PATENT NO. : 6,924,933 B2
DATED : August 2, 2005
INVENTOR(S) : Mitsuo Yamamoto

It is certified that error appears in the above-identified patent and that said Letters Patent is hereby corrected as shown below:

<u>Title page,</u>
Item [57], ABSTRACT,
Line 1, delete "dipotric" and insert -- dioptric --.

<u>Column 12,</u>
Line 54, delete "alone" and insert -- along --.

<u>Column 13,</u>
Line 31, delete "alone" and insert -- along --.

Signed and Sealed this

Eighteenth Day of April, 2006

JON W. DUDAS
*Director of the United States Patent and Trademark Office*